US009533672B2

(12) United States Patent
Christ

(10) Patent No.: US 9,533,672 B2
(45) Date of Patent: Jan. 3, 2017

(54) METHOD FOR DAMPING MECHANICAL VIBRATIONS IN A VEHICLE

(71) Applicant: Bayerische Motoren Werke Aktiengesellschaft, Munich (DE)

(72) Inventor: Thomas Christ, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 98 days.

(21) Appl. No.: 14/103,977

(22) Filed: Dec. 12, 2013

(65) Prior Publication Data

US 2014/0100733 A1    Apr. 10, 2014

Related U.S. Application Data

(63) Continuation of application No. PCT/EP2012/059360, filed on May 21, 2012.

(30) Foreign Application Priority Data

Jun. 15, 2011    (DE) .......................... 10 2011 077 525

(51) Int. Cl.
 *B60W 20/00* (2016.01)
 *B60W 10/08* (2006.01)
 *B60W 30/20* (2006.01)
 *B60W 10/06* (2006.01)
 *B60W 50/00* (2006.01)

(52) U.S. Cl.
 CPC ............. *B60W 20/00* (2013.01); *B60W 10/06* (2013.01); *B60W 10/08* (2013.01); *B60W 30/20* (2013.01); *B60W 2030/206* (2013.01); *B60W 2050/0057* (2013.01); *B60W 2710/083* (2013.01); *B60W 2710/085* (2013.01); *Y10S 903/93* (2013.01)

(58) Field of Classification Search
 CPC ........ B60W 20/00; B60W 10/06; B60W 10/08
 USPC .......................... 701/22, 111; 180/65.21, 381
 See application file for complete search history.

(56) References Cited

U.S. PATENT DOCUMENTS

| 6,102,144 A | 8/2000 | Lutz |
| 7,633,257 B2 | 12/2009 | Sakamoto et al. |
| 2006/0173590 A1 | 8/2006 | Zillmer et al. |
| 2012/0043538 A1 | 2/2012 | Ye |
| 2012/0078456 A1 | 3/2012 | Hakumura et al. |

FOREIGN PATENT DOCUMENTS

| CN | 101580010 A | 11/2009 |
| DE | 197 21 298 A1 | 11/1998 |

(Continued)

OTHER PUBLICATIONS

International Search Report dated May 10, 2012 with English translation (seven (7) pages).

(Continued)

*Primary Examiner* — John Q Nguyen
*Assistant Examiner* — Anshul Sood
(74) *Attorney, Agent, or Firm* — Crowell & Moring LLP

(57) ABSTRACT

A method for damping mechanical vibrations is provided, in particular torsion vibrations, in a vehicle that has a drive train comprising a combustion engine and an electrical drive motor, wherein a signal describing the current vibration behavior of at least one vehicle component is subjected to a vibration analysis, and at at least one interference frequency contained in the signal, a compensation torque counteracting said interference frequency is generated by the electric drive motor.

12 Claims, 3 Drawing Sheets

(56) References Cited

FOREIGN PATENT DOCUMENTS

| | | |
|---|---|---|
| DE | 199 11 096 C2 | 3/2001 |
| DE | 10 2005 001 047 A1 | 7/2006 |
| DE | 10 2007 013 753 A1 | 10/2007 |
| DE | 10 2010 007 735 A1 | 8/2011 |
| FR | 2 763 645 A1 | 11/1998 |
| WO | WO 01/14944 A1 | 3/2001 |
| WO | WO 2012/043538 A1 | 4/2012 |

OTHER PUBLICATIONS

German Search Report with English translation dated Feb. 2, 2012 (nine (9) pages).
Chinese Office Action dated May 25, 2015 with English-language translation (fifteen (15) pages).
Chinese Office Action dated Dec. 29, 2015 with English-language translation (six (6) pages).

METHOD FOR DAMPING MECHANICAL VIBRATIONS IN A VEHICLE

CROSS REFERENCE TO RELATED APPLICATIONS

This application is a continuation of PCT International Application No. PCT/EP2012/059360, filed May 21, 2012, which claims priority under 35 U.S.C. §119 from German Patent Application No. DE 10 2011 077 525.0 filed Jun. 15, 2011, the entire disclosures of which are expressly incorporated by reference herein.

BACKGROUND AND SUMMARY OF THE INVENTION

The present invention relates to a method of damping mechanical vibrations in a vehicle according to the characteristics of Claim 1.

It is known that vehicles having a hybrid drive have a drive train with an internal-combustion engine and at least one electric machine (electric driving motor). For a further reduction of the fuel consumption, internal-combustion engines with exhaust gas turbochargers are increasingly considered which, in comparison to conventional internal-combustion engines, operate at lower rotational speeds and have fewer cylinders (for example, 3-cylinder engines instead of the previous 4-cylinder engines, or 4-cylinder engines instead of the previous 6-cylinder engines) while the performance is essentially the same or higher. The lower the rotational speed level and the number of cylinders of an internal-combustion engine, the larger the rotational non-uniformity resulting from the combustion.

In order to avoid a transmission of such system-caused rotational non-uniformities into the drive train or onto the vehicle body, special measures have to be taken.

A first approach in this respect is described in German Patent Document DE 10 2005 001 047 A1, specifically in connection with a hybrid vehicle. The hybrid vehicle has an internal-combustion engine having several cylinders and an electric machine provided for generating vehicle propulsion. For saving fuel, individual cylinders can be "switched off" during the operation of the internal-combustion engine. They will then move along unfired. Naturally, a cylinder switch-off is connected with an increase of the rotational non-uniformity of the torque supplied by the internal-combustion engine. In German Patent Document DE 10 2005 001 047 A1, a "degree" is determined for the rotational non-uniformity and, as a function of this degree, the electric machine is activated by the electric motor or generator such that the increase of the rotational non-uniformity caused by the cylinder switch-off is reduced. Details for controlling or regulating the electric machine are not given in German Patent Document DE 10 2005 001 047 A1.

It is an object of the invention to indicate a method of damping mechanical vibrations in a (hybrid) vehicle, which can be implemented by means of comparatively low expenditures.

The starting point of the invention is the idea of subjecting a signal describing the current vibration behavior of at least one vehicle component to a signal analysis and generating, by the electric driving motor of the (hybrid) vehicle, for at least one "interfering frequency" contained in the signal, a compensation torque counteracting this interfering frequency.

The term "vehicle component" used in the following description and in the claims should be interpreted extremely broadly. It may relate to an individual component as well as to a component composite, formed by a plurality of components, for example, to a vehicle body, to a functional unit, as for example, the electric machine, or the like.

"The signal describing the current vibration behavior of the vehicle component" may, for example, be an acceleration signal, for example, an acceleration signal which describes the acceleration (vibration) of the vehicle structure (vehicle body) or of a component of the vehicle body.

As an alternative, a rotational speed of a vehicle component, such as the rotational speed of the internal-combustion engine or that of the electric machine or the like, could also be used as the signal describing the current vibration behavior of a vehicle component. Furthermore or as an alternative, the current vibration behavior could also be described by a signal which describes a measured or approximately mathematically (for example, by a state observer) determined drive torque of a vehicle component (such as an axle torque).

According to the invention, it may be provided that the at least one interference frequency, which is examined within the scope of the signal analysis (for example, by a discrete Fourier transform), is a predefined interference frequency that is specific of the type of internal-combustion engine used. The at least one interference frequency may particularly be a so-called "engine order". By means of the signal analysis, frequencies beyond the engine orders could also be determined and damped.

As known, as a function of the construction of an internal-combustion engine (in-line engine, V-engine) and the number of its cylinders, there are, in addition to the basic frequency of the internal-combustion engine, certain so-called "harmonics". The frequencies of the harmonics (interference frequencies) frequently are multiples of the basic frequency of the internal-combustion engine. In the case of some internal-combustion engines, there is also a harmonic whose frequency corresponds to half the basic frequency. These interference frequencies have the name of so-called ("engine) orders". The ordinal number indicates the factor with respect to the basic frequency. Thus, the 0.5th engine order corresponds to that interference frequency curve whose frequency corresponds to half the rotational engine speed. The third engine order corresponds to the interference frequency curve with three times the rotational engine speed.

According to the invention, it may be provided that—depending on the type of the just present internal-combustion engine—one compensation torque respectively counteracting the assigned interference frequency is calculated for one, two, three or more engine orders and is superposed on the drive train by way of the electric driving motor.

As an alternative or in addition, it may also be provided that at least one interference frequency or several interference frequencies are determined by a Fourier analysis. The exact method of carrying out the Fourier analysis is sufficiently known to the person skilled in the art from the prior art and therefore does not have to be explained in detail. Corresponding information is contained, for example, in Brigham, E. Oran (1988). The Fast Fourier Transform and Its Applications. Englewood Cliffs, N.J.; Prentiss Hall, ISBN 0-13-307505-2.

If the signal describing the current vibration behavior of the at least one vehicle component is an analog signal, it may be provided that this signal is sampled with a predefined sampling frequency and the resulting sampling signal is subjected to a discrete Fourier transform (DFT). By examining the frequency response of this signal, those frequencies can easily be determined which cause particularly disturbing rotational non-uniformities or vibrations or noises in the vehicle.

It can frequently be observed that the signal describing the current vibration behavior of the at least one vehicle component does not contain only a single particularly dominant interference frequency but several interference frequencies. Correspondingly, it may be provided that, by an electronic system, compensation torques assigned to several interference frequencies contained in the signal, are calculated, and these compensation torques are superposed on the compensation torque to be generated by the electric driving motor of the hybrid drive.

The signal form of the compensation torque to be generated for a defined interference frequency can be generated as follows: By a frequency generator, two periodic "test signals" phase-shifted by 90° are generated which each have the same frequency as the considered interference frequency to be compensated.

By a predefined transmission function, which describes the transmission behavior between the electric driving motor of the (hybrid) vehicle and the at least one vehicle component whose vibration is monitored, a "first test output signal" is generated from the first test signal, and a "second test output signal" is generated from the second test signal.

Subsequently, by a "recursive least mean square algorithm" sufficiently known to the person skilled in the art, a so-called adaptation coefficient is determined. A recursive least mean square algorithm is known, for example, from Haykin, S. Adaptive Filter Theory. 3rd ed. Englewood Cliffs, N.J.: Prentice Hall, 1996.

The first or the second test output signal and the signal describing the current vibration behavior of the at least one vehicle component form input signals for the least mean square algorithm.

A "first adaptation coefficient" is generated from the first test output signal and the signal describing the current vibration behavior of the at least one vehicle component. From the second test output signal and the signal describing the current vibration behavior of the at least one vehicle component, a "second adaptation coefficient" is generated.

The first adaptation coefficient is multiplied by the assigned first test signal, and the second adaptation coefficient is multiplied by the assigned second test signal to a first and second correction term respectively. The sum of the two correction terms describes the signal form of a compensation torque damping or absorbing the considered interference frequency.

In the above-described manner, compensation torque courses assigned to several interference frequencies can be calculated by an electronic system. These can then be superposed on the compensation torque to be generated by the electric driving motor of the hybrid drive, i.e., added to the above-mentioned (total) compensation torque, which is superposed from the drive of the vehicle by the electric driving motor. The electric driving motor is therefore activated such that it generates a (total) compensation torque, which damps or ideally even completely absorbs the individual interference frequencies.

Summarizing, particularly the following advantages can be achieved by the invention:
The described method provides a simple possibility for the damping of vibrations in the drive train for hybrid vehicles;
the method can be easily applied because only a few parameters have to be adjusted;
the method requires only a few sensor signals. A high-expenditure communication between control devices is therefore eliminated;
the algorithm has a low susceptibility to signal traveling times.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
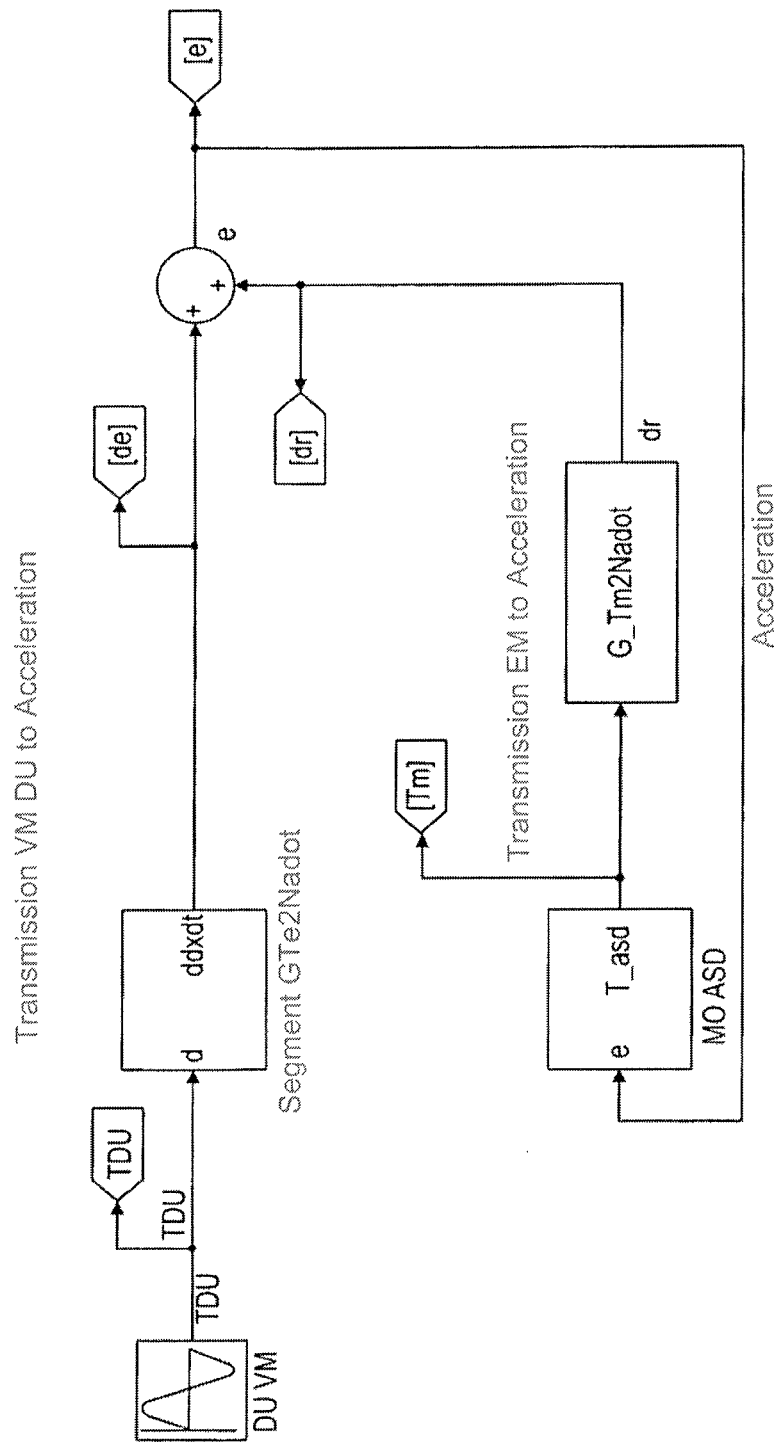
FIG. 1 is a schematic representation of a control circuit for the damping of mechanical vibrations in a vehicle in accordance with an embodiment of the present invention.

FIG. 1 describes a control circuit model of a vehicle, which has a drive train with an internal-combustion engine and an electric driving motor.

The internal-combustion engine generates a drive torque TDU which has a certain rotational non-uniformity DU VM. The drive torque TDU is transmitted by way of the drive train to driving wheels of the vehicle. The rotational non-uniformity DU VM of the drive torque TDU is exhibited, for example, in that one or more components of the vehicle start to vibrate at certain rotational (driving) speeds. When such interference frequencies are introduced, for example, into the vehicle body, this may be perceived as very unpleasant acoustically.

In the control circuit model illustrated in FIG. 1, the transmission behavior of the "segment" between the internal-combustion engine, at or in which the rotational non-uniformities DU VM are generated, and the vehicle component (for example, the vehicle body) whose vibration behavior is analyzed or monitored, is mathematically imaged by the transmission function "GTe2Nadot(z)". The interference frequency fraction generated by the internal-combustion engine is marked by the symbol de in FIG. 1.

The transmission function GTe2Nadot(z) may, for example, be a discrete-time linear transmission function. It can be obtained, for example, by setting up a physical vehicle model or by data-driven modeling processes. The parameters of the transmission function GTe2Nadot(z) can be determined, for example, by the method described in German Patent Application DE 10 2010 007 735.

As mentioned above, the drive train of the vehicle modeled in FIG. 1 further has an electric driving motor (not shown). The transmission behavior between the electric driving motor and the "monitored vehicle component" is described by the transmission function "G_Tm2Nadot(z)". This can analogously be determined like the transmission function GTeNadot(z). The acceleration-interference vibration fraction generated by the electric driving motor is marked by the symbol dr in FIG. 1.

The excitation de generated by the internal-combustion engine and excitation dr generated by the electric driving motor are superposed on the signal e, which describes the vibration behavior of a concretely considered vehicle component (for example, vehicle structure or vehicle body).

The signal e can also be interpreted as a "fault" signal". It is fed back and forms an input signal of a logic block or module "MO ASD" which activates the electric driving motor such that the latter generates a compensation torque counteracting the fault signal, which will be explained in detail below in connection with FIG. 2.

Figure 2:
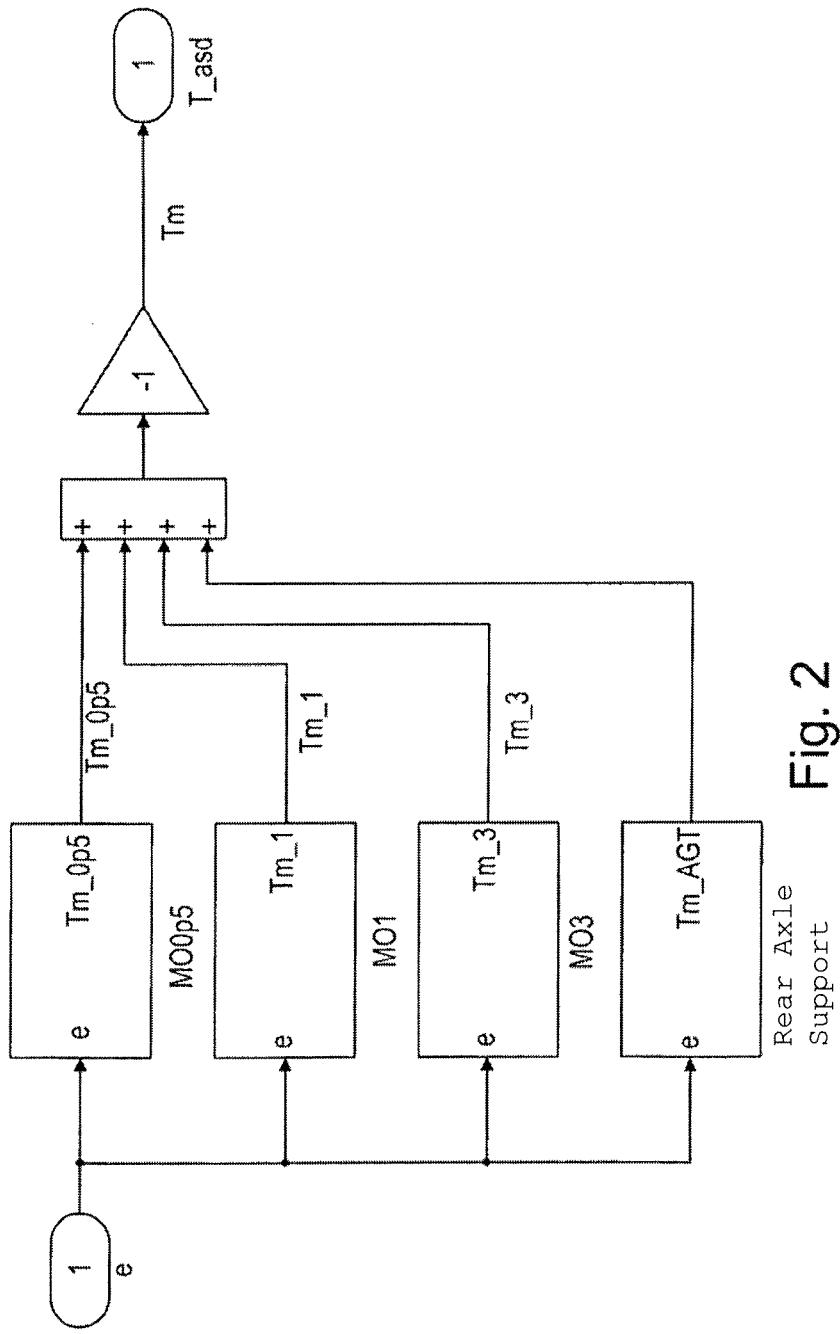
FIG. 2 is a view of the rough logic implemented in the control circuit of FIG. 1 for generating a compensation torque.

In the embodiment illustrated in FIG. 2, the vehicle body acceleration (fault signal) e=de+dr is supplied to the logic modules Tm_0p5, Tm_1, Tm_3 and Tm_HAGT. In the module Tm_0p5, the course of a compensation torque assigned to the 0.5th engine order is computed. In module Tm_1, the course of a compensation torque assigned to the first engine order is computed. In module Tm_3, the course of a compensation torque assigned to the third engine order is computed. These engine orders are a function of the constructive design of the internal-combustion engine. In the module Tm_HAGT, the course of a compensation torque is computed, which has the purpose of damping or absorbing vibrations of the rear axle support HAGT.

The compensation torques computed in the above-mentioned logic modules are superposed in an addition block and are outputted as the (total) compensation torque T_asd to be generated by the electric driving motor.

Figure 3:
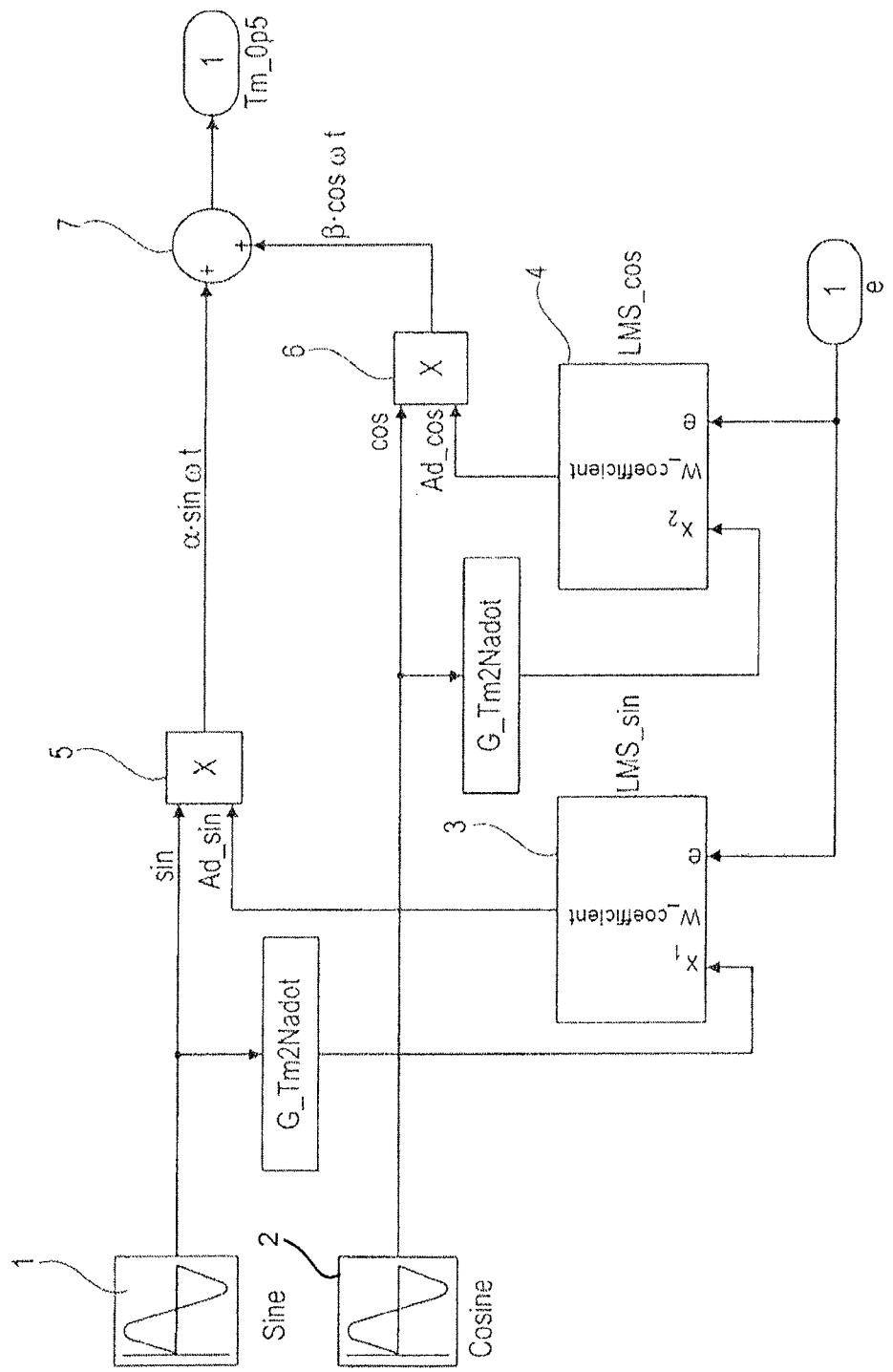
FIG. 3 is a view of the logic for generating a compensation torque for a certain interference frequency, on which the rough logic of FIG. 2 is based.

FIG. 3 describes a logic by means of which, for the 0.5th engine order, a compensation torque Tm_0p5 can be computed that is assigned to the corresponding interference frequency. Correspondingly, compensation torques can also be computed for other interference frequencies.

By a frequency generator, two periodic signals phase-shifted by 90° are generated (or this is implemented by way of a "time-controlled look-up" in a control device of the vehicle). In the case of the logic illustrated in FIG. 3, this is a sine signal 1 and a cosine signal 2. The two signals 1, 2 have a frequency corresponding to the considered interference frequency, i.e. the 0.5th engine order.

The interference frequencies to be analyzed can be fixedly predefined as a function of the considered internal-combustion engine in the form of certain engine orders, or can be determined by way of a Fourier analysis, particularly a discrete Fourier analysis, beforehand or cyclically during the operation of the vehicle.

By the above-introduced transmission function G_Tm2Nadot(z), a first test output signal x1 and a second test output signal x2 are generated from the two test signals 1, 2.

In the logic modules 3, 4, a first adaptation coefficient Ad_sin and a second adaptation coefficient Ad_cos are generated by means of a predefined recursive least mean square algorithm.

The assigned first test output signal x1 or the assigned second test output signal x2 and the signal e (for example vehicle body acceleration e=de=+dr) describing the vibration behavior of the considered vehicle component (for example, of the vehicle body) are used as input parameters for the two "least mean square modules" 3, 4.

The first adaptation coefficient Ad_sin is multiplied by the assigned first test signal 1 by a multiplier 5 to a first correction term $\alpha \times \sin \omega t$. Correspondingly, the second adaptation coefficient Ad_cos is multiplied by the assigned second test signal 2 in a multiplier 6 to a second correction term $\beta \times \cos \omega t$.

The two correction terms $\alpha \times \sin \omega t$ and $\beta \times \cos \omega t$ are superposed by an analog adder 7 on the course of the compensation torque Tm_0p5 assigned to the considered interference frequency (0.5th engine order).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of damping mechanical vibrations in a vehicle having a drive train with an internal-combustion engine and an electric driving motor, comprising the acts of:
   conducting a vibration analysis on signals describing a current vibration behavior between the internal-combustion engine and the vehicle body,
   conducting a vibration analysis on signals describing a current vibration behavior between the electric driving motor and the vehicle body;
   using the vibration analyses to determine an interference frequency;
   generating a fault signal that describes the interference frequency;
   supplying the fault signal to each of a plurality of logic modules;
   computing a separate compensation torque to dampen the mechanical vibrations in the vehicle using each logic module, each logic module computing a different compensation torque at a different internal-combustion engine speed that is a harmonic of the supplied interference frequency of the engine;
   adding all computed compensation torques to generate a total compensation torque; and
   supplying the total compensation torque to the vehicle via the electric motor.

2. The method according to claim 1, wherein
   the interference frequency is a predefined interference frequency associated with a predefined engine order of the internal-combustion engine type in the drive train.

3. The method according to claim 1, wherein
   the signals describing the current vibration behavior are sampled with a predefined sampling frequency and the signals are subjected to a discrete Fourier analysis.

4. The method according to claim 1, wherein
   the act of computing a separate compensation torque includes determining a plurality of interference frequency-specific compensation torques associated with a corresponding plurality of interference frequencies contained in the signal using an electronic system, and superimposing the plurality of interference frequency-specific compensation torques on the compensation torque to be generated by the electric driving motor.

5. The method according to claim 4, wherein
   a course of at least one of the plurality of interference frequency-specific compensation torques is generated by superposition of at least two periodic test signals which are phase-shifted by 90°, the at least two periodic test signals each have a frequency corresponding to the corresponding interference frequency of said at least one of the plurality of interference frequency-specific compensation torques.

6. The method according to claim 5, wherein
   a first test output signal is generated from a first one of the at least two periodic test signals and a second test output signal is generated from a second one of the at least two periodic test signals, and
   the first test output signal and the second test output signal are generated from each of the test signals from a predefined transmission function describing a transmission behavior between the electric driving motor and the vehicle body.

7. The method according to claim 6, wherein
a predefined least mean square algorithm generates first and second adaptation coefficients from the first and the second test output signal, respectively, and the signal describing the current vibration behavior between the electric driving motor and the vehicle body, and
the first and second adaptation coefficients are multiplied by the respective first and second test signal to generate respective first and second corrections terms.

8. The method according to claim 7, wherein
at least one of the interference frequency-specific compensation torques is generated by adding the first and second corrections terms corresponding to a one of the plurality interference frequencies corresponding to the at least one of frequency-specific compensation torques.

9. The method according to claim 1, wherein the signals describing the current vibration behavior is at least one of measured directly by a sensor system and determined by a predefined algorithm from at least one other signal.

10. The method according to claim 9, wherein
the signals describing the current vibration behavior is an acceleration signal of a vehicle body.

11. The method according to claim 1, wherein
the signals describing the current vibration behavior is a rotational speed signal of at least one of the internal-combustion engine and the electric driving motor.

12. The method according to claim 1, wherein
the signals describing the current vibration behavior is a signal describing a torque transmitted by a torque-transmitting component of the drive train.

* * * * *